Aug. 23, 1960  R. E. MASTIN  2,949,636
MOLD FOR MAKING A SPIRAL THREADED RUBBER MOLDED ARTICLE
Filed July 14, 1958  2 Sheets-Sheet 1
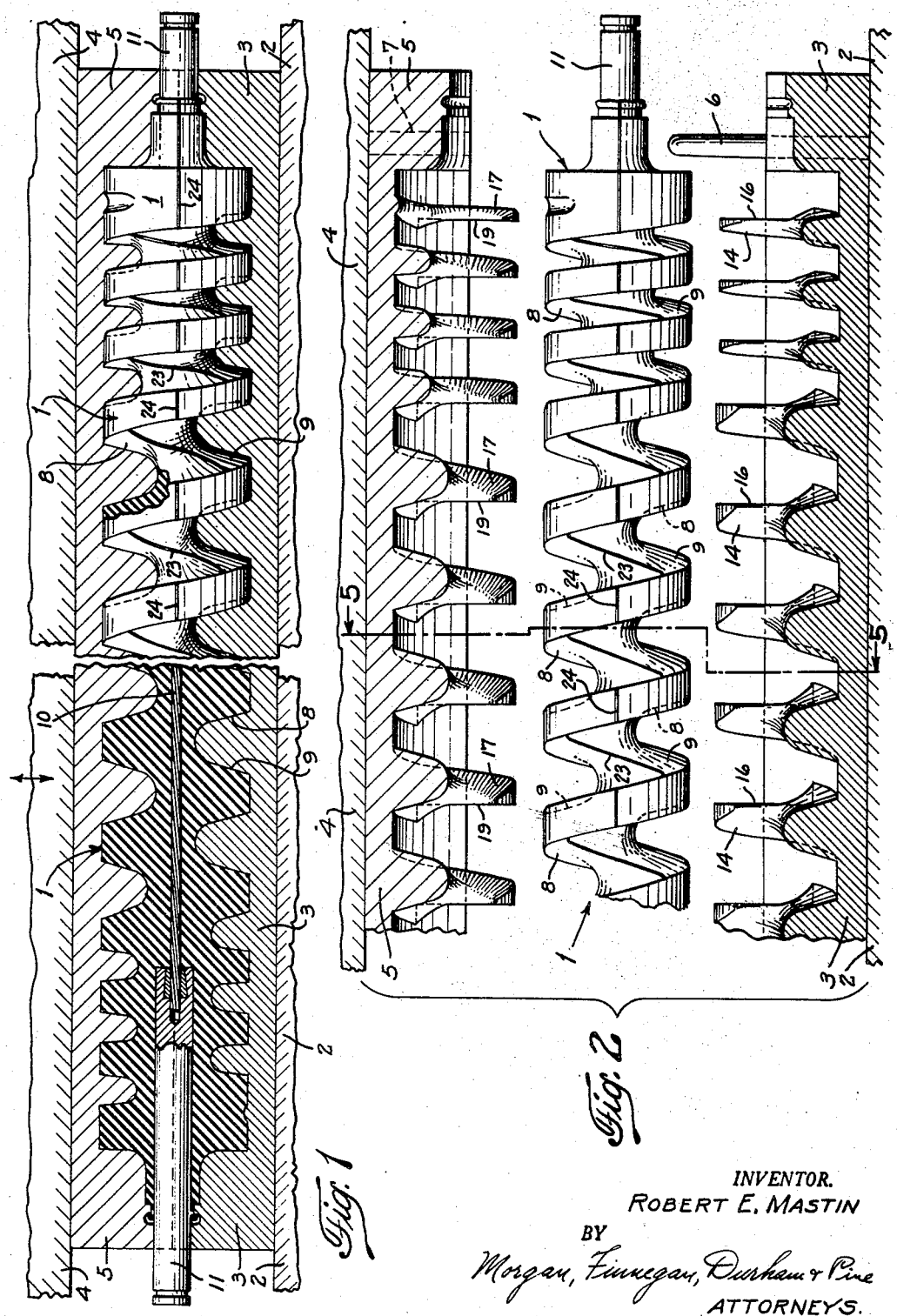
INVENTOR.
ROBERT E. MASTIN
BY
Morgan, Finnegan, Durham & Pine
ATTORNEYS.

Aug. 23, 1960 R. E. MASTIN 2,949,636
MOLD FOR MAKING A SPIRAL THREADED RUBBER MOLDED ARTICLE
Filed July 14, 1958 2 Sheets-Sheet 2
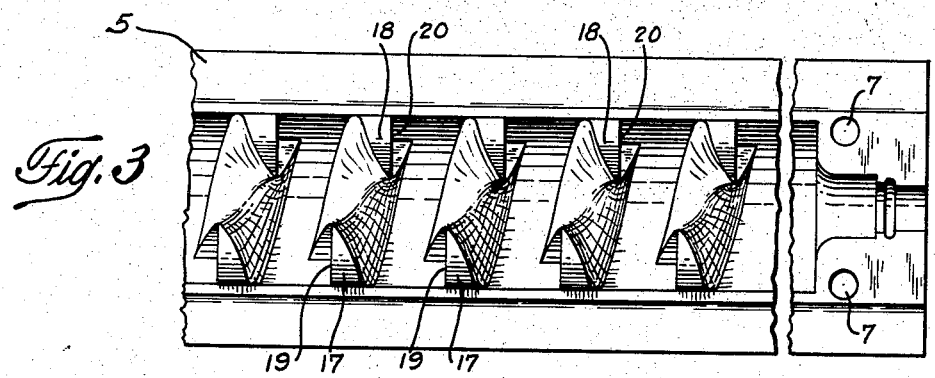
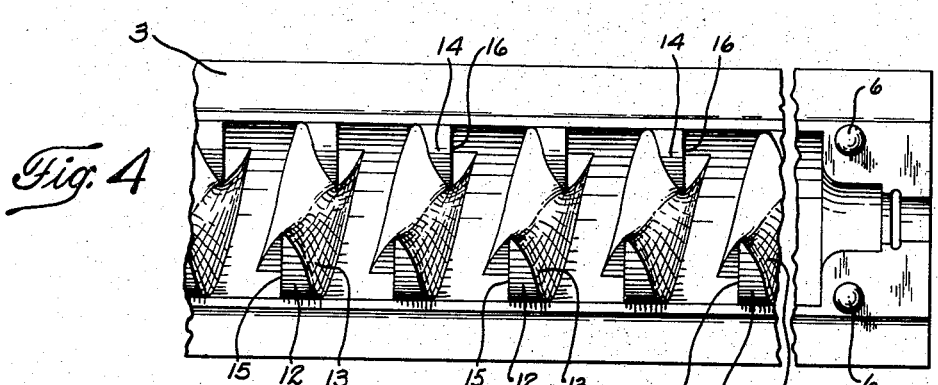
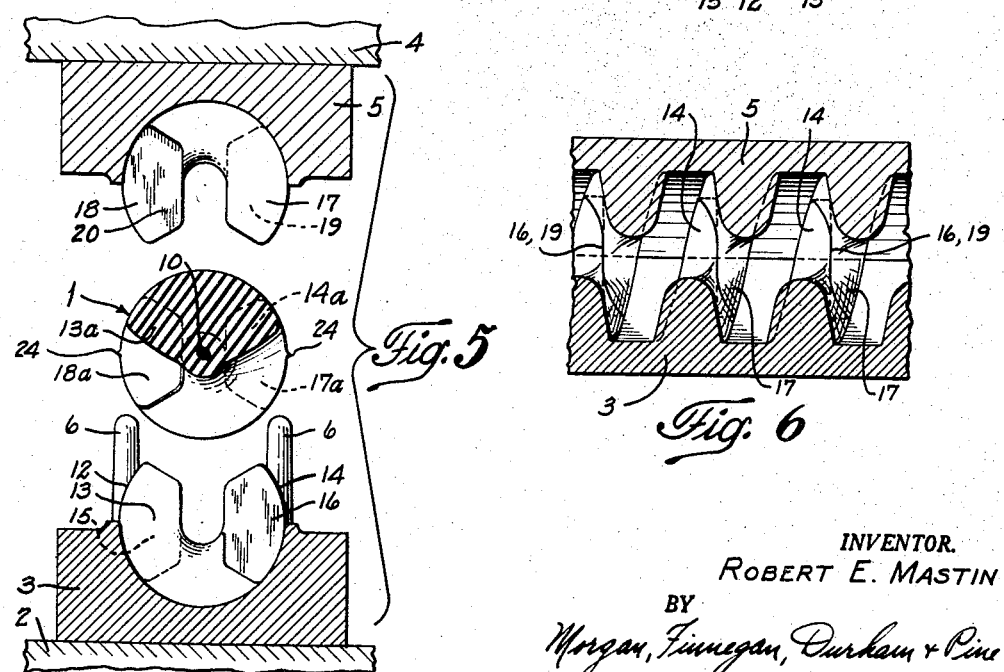
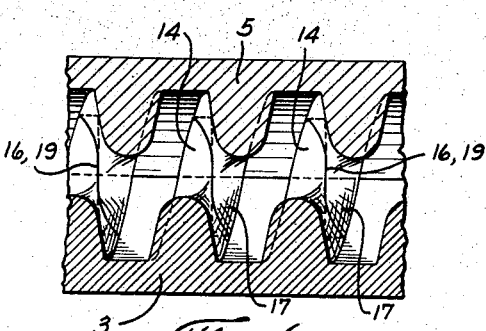
INVENTOR.
ROBERT E. MASTIN
BY
Morgan, Finnegan, Durham & Pine
ATTORNEYS.

United States Patent Office 2,949,636
Patented Aug. 23, 1960

2,949,636

MOLD FOR MAKING A SPIRAL THREADED RUBBER MOLDED ARTICLE

Robert E. Mastin, Ridgewood, N.J., assignor to La Favorite Rubber Manufacturing Co., Hawthorne, N.J., a corporation of New Jersey Filed July 14, 1958, Ser. No. 748,443

3 Claims. (Cl. 18—42)

This invention relates to helically threaded molded articles, particularly to such articles made of non-resilient materials, and more particularly to such articles intended for use as rollers in belt conveyor systems, and more particularly to the construction of two piece or two part molds for making such articles.

Belt conveyor systems use a number of cylindrical rollers to carry the belt to support and move the belt in belt conveyor systems. It is customary for such rollers to be made of molded elastomers, since such elastomers can be easily molded at reduced cost in large quantities. Elastomer rollers also are axially flexible and will axially bend under a load to provide a slight trough contour to the belt supported thereon.

Where the belt conveyor system is intended and designed for use in moving large quantities of heavy materials, it is customary for each roller to consist of three parts, i.e. three rollers axially aligned at a right angle to the path of travel of the belt. In this practice, the middle roller is horizontally disposed. The outer rollers are positioned with their inner ends slightly spaced away from and in the same plane as the middle roller but with their outer ends extending upwardly at a slight angle. With this arrangement, material on the belt does not creep off the sides of the belts.

Rollers for belt conveyor systems have customarily been prepared as smooth cylinders. When belt conveyor systems are operated at high speeds with heavy weights on smooth cylindrical rollers, the belt tends to whip or jostle up and down. Apparently, this whipping is caused by the axial flexing of each roller as it rotates at high speed. Intermittent contact between the belt and rollers is caused by the jostling with undesirable vibration, oscillation and shaking of the materials being moved on the belt. Excessive wear of the belt, the rollers, and the bearings for the rollers is produced under these conditions. Moreover, if the rollers are disposed in groups of three in axial alignment as described above, excessive wear occurs on the ends of the rollers. Replacement of the rollers because of loss of cylindrical configuration is necessary at very frequent intervals.

In a helically threaded roller, on the other hand, the thread or spiral helix overhangs itself through every arc of 180°. In other words, an undercut exists on each face of the thread within every arc of 180°. Attempts to mold such a roller in elastomer with a two piece or two part mold have not been successful because removal of the mold parts in a movement normal to the axis is prevented by the overhangs on the thread. The overhang adjacent the undercut will lie athwart the path of removal of the parts. The pieces of the mold lock in place on the molded article itself. Removal can be accomplished only by destroying the molds—with consequent prohibitive costs.

These difficulties have been obviated by the present invention. Speaking generally, the present invention provides a helically threaded molded elastomer roller for belt conveyor systems. These rollers have desired axial flexibility but cause substantially no jostling of the belt during high speed rotation. Intermittent contact with consequent vibration, oscillation and shaking are negligible. When groups of three such rollers are axially aligned as described above, there is very little wear on the corners of each roller. Repair of the belt, the rollers and the bearings for the rollers is reduced. The spirally threaded molded elastomer rollers provide continuous and smooth contact with and support for the belt throughout the width of the belt.

In addition, the present invention provides a two piece or two part mold in which a helically threaded molded elastomer roller is cast or molded without locking the roller within the mold. After each such casting the two mold pieces are separated in the desired movement normal to the axis of the article. No destruction of the mold parts is necessary. The same mold can be used over and over again for casting of innumerable helically threaded molded elastomer rollers.

Briefly, this is accomplished by a mold consisting of two molding halves having molding surfaces of helical configuration. One side of the bottom molding half has fingers with molding surfaces of helical configuration which extend upwardly through an angle of 135° to mold one side of the forward face of each helical thread. The corresponding side of the top molding half has fingers with molding surfaces of helical configuration which extend downwardly through an angle of 135° to mold the same side of the rear face of each helical thread. The remaining side of the bottom molding half has fingers with molding surfaces of helical configuration which extend upwardly through an angle of 135° to mold the other side of the rear face of each helical thread. The remaining side of the top molding half has similar fingers with molding surfaces of helical configuration which similarly extend downwardly through an angle of 135° to mold the remaining other side of the forward faces of each helical thread. All of the fingers have complementary non-molding surfaces arranged so that the non-molding surfaces of the fingers on the bottom molding half for the forward face of the helical thread engage and seat with the non-molding surfaces of the fingers on the top molding half for the rear face of the spiral thread when the mold halves are assembled so that the fingers form a continuous molding surface. Similarly, the non-molding surfaces of the fingers on the top molding half for the forward face of the thread engage or seat with the non-molding surfaces of the fingers on the bottom molding half for the rear face of the helical thread when the mold halves are assembled so that the fingers form a continuous molding surface. Preferably, these complementary non-molding surfaces of the fingers are flat; and, more preferably they are normal to the axis of the helical thread.

To briefly state the matter another way, the invention consists of a two part mold forming a helical thread extending through an arc of 360°. Each of these mold parts has molding surfaces which are spaced apart for simultaneously forming the forward and rear faces of the 360° thread with each of these surfaces helixing about a common axis through an arc of 180° and being displaced from each other in azimuth on that axis by 90°. The molding surfaces for one face of the thread lead the molding sufaces for the other faces of the thread by 90°. Each of the molding parts has (between the spaced apart molding surfaces) complementary engaging surfaces, preferably flat and normal to the axis of the thread, and extending over the arc of displacement.

Preferably, the spacing between the spaced-apart molding surfaces decrease along the axis.

The invention provides a conveyor system roller of molded non-resilient material which is helical. Preferably, the roller has treads of constant width, and more preferably it has a pitch decreasing towards its ends.

The accompanying drawings show a detailed embodiment of the invention.

In the drawings:

Figure 1 is a vertical section through the mold of the invention with the molded roller of the invention therein, the molded roller and the mold being shown in section on the left hand side of the drawing but only the mold and a broken away part of the roller being shown in section on the right hand side of the drawing;

Figure 2 is similar to Figure 1 except that the movable upper half of the mold has been raised, and the molded roller has been extracted from the mold and suspended in space;

Figure 3 is a plan view of part of the upper mold half looking into the mold half;

Figure 4 is a plan view similar to Figure 3 but looking into the lower mold half;

Figure 5 is a section view along the line 5—5 of Figure 2; and

Figure 6 is a fragmentary vertical section of the two mold halves brought together into molding position similar to Figure 1 but without the molded roller therein.

Referring now to the details of the illustrative embodiment of the invention shown in the drawings, the helically threaded molded elastomer roller is generally designated by the numeral 1.

The mold consists of two parts or halves with stationary platten 2 carrying the lower mold half 3 and a vertically movable platten 4 carrying the upper mold half 5. Two alignment pins 6 are mounted on each end of platten 2 and extend upwardly through lower mold half 3. Upper mold half 5 has two holes 7 at each end thereof disposed to receive pins 6 to align both halves of the mold when they are assembled for the molding operation.

The helically threaded molded elastomer roller 1 has the configuration of a helical screw with a plurality of continuous threads, each thread extending through an arc of 360°. Each thread has two opposed faces. For ease of understanding, these are referred to hereinafter as forward faces 8 (which face to the left along the axis of the thread in Figure 2) and rear faces 9 (which face in the opposite direction along the axis of the thread). The roller is made of molded elastomer, e.g. rubber, neoprene, nitrile, butyl, hypolon, etc. The tread area of the helix, in the preferred embodiment illustrated on the drawing, is approximately equal to one-third of the pitch on the spiral. The illustrated embodiment of the roller has an internal core 10 (see Figure 5) made of stainless steel cable with solid steel ends 11 (Figure 2) swaged on to the ends of the cable. The core provides added tensile strength to the roller. The spirals at the ends of the roller have a pitch less than the spiral threads in the intermediate portion of the roller to provide added axial rigidity in the end portions of the roller as compared to the relatively more axially flexible middle portion thereof. The treads in the middle portion of the roller are of constant width; and, the treads of the end portions are of constant width. They do not periodically widen and narrow in accordance with a pre-selected arc of displacement. There is, however, a progressive and constant decrease in tread width between the middle portion and the end portion of the roller because of the change in pitch. Hereinafter, the expression constant tread width will be used to designate treads of absolutely constant tread width and treads having progress and non-periodic changes in width because of change in pitch.

As can be seen from the side view of the roller (Figure 2), the tread area for each helical thread of the roller overhangs side faces of each thread. Compare the solid line of the treads with the dotted lines of the side faces in Figure 2. The tread of each thread appears to overhang a portion of the rear face 9 on one side of the axis and the same tread of each thread appears to overhang a forward face 8 on the opposite side of the axis of the roller. If the perspective is changed from a side view to a top view, so that the lines of sight coincide with the path of vertical movement of upper mold half 5, a similar pair of overhangs appear—one on the forward face of each thread on one side of the axis and another overhang on the rear face on the other side of the axis. A bottom view is similar. In sum, there is an undercut area in each thread on each side of the axis in the upper half of the roller and also in the lower half of the roller—totalling four undercut areas for each thread—relative to top and bottom lines of sight or relative to vertical mvement of the mold halves.

Each of the molding halves 3 and 5 has molding surfaces of helical configuration as can be seen most easily in Figure 6.

The lower mold half 3 has a series of fingers 12 along one of its sides (the lower side as shown in Figure 4). One finger 12 is provided for each thread of the roller, with a molding surface 13 of helical configuration which extends upwardly through an arc of 135°. See Figures 4 and 5. The helical molding surface of each finger 12 forms a molding cavity for one side of each forward face of the roller 1 thread including the undercut area in the forward face 8 in the upper half of the thread. The finger 12 shown in Figure 5 reaches upwardly to a position behind the cross-hatched portion 13a of the roller thread within the dotted line on the left upper side of the roller there illustrated. The cross-hatched portion 13a, so circumscribed, is the undercut area generally. The other side of lower mold half 3 (the upper side as shown in Figure 4) carries a series of fingers 14, one for ech thread, having molding surfaces which extend upwardly through an arc of 135°. These molding surfaces have helical configuration and form a molding cavity for the rear faces 9 on the other side of the axis of the roller 1 including the undercut area in the top right half of the roller illustrated in Figure 5. This undercut area, generally, is marked 14a on Figure 5. Each of the fingers 12 and 14 have non-molding surfaces 15 and 16 respectively which, preferably, are flat and normal to the axis of the thread.

Similarly, the top half 5 of the mold has one side of fingers 17 and another side of fingers 18, one each such finger for each thread of the roller 1. These fingers also have molding surfaces of helical threaded configuration but the surfaces extend downwardly through an arc of 135°. The molding surfaces of the side of fingers 17 (the lower side as shown in Figure 3) form a molding cavity for the remaining side of the forward faces of the roller including the undercut area in the forward face 8 in the lower half of the thread. As shown in Figure 5, the finger 17 reaches downwardly to a position rearward of finger 14 into the area marked generally as 17a within the full line on the lower right side of the roller there illustrated. This general area is the location of the undercut in the lower right side of the forward face 8 of the roller. The helical molding surfaces of the side of fingers 18 (the upper side as shown in Figure 3) form a molding cavity for the remaining side of the rear faces of the roller threads including the undercut area in the rear faces 9 but in the lower half of the thread. As shown in Figure 5, finger 18 reaches downwardly to a position forward of finger 12 and occupies the area generally marked as 18a on the roller there illustrated which represents the undercut area in the lower left hand side of the thread. Each of the fingers 17 and 18 have non-molding surfaces 19 and 20 complementary to the non-molding surfaces 16 and 15, respectively, and preferably are flat and normal to the axis of the thread.

When the mold halves 3 and 4 are brought together into assembled position for molding, the flat surfaces 15 of the fingers 13 are complementary to and preferably slide into seating position on the flat surfaces 20 of finger 18 and the helical surfaces of these fingers together form the total molding cavities for the left hand side of the roller as viewed in Figure 5. Similarly, the non-molding surfaces 16 of fingers 14 are complementary to and preferably slide into seating engagement with the surfaces 19 of fingers 17 and the helical surfaces of these fingers form the molding cavities for the right hand side of the roller as viewed in Figure 5. As illustrated, the fingers slide on vertical planes forming vertical parting lines on the mold adjacent the undercut areas so that the mold halves can be placed in assembled position and disassembled by completely vertical movement.

In the use of the mold to produce the spiral threaded roller of the invention, rough rubber preformed into strips is wound around a steel cable 10 having solid steel ends 11 swaged thereon. The strips are wound into a position approximating the position of threads intended for the roller. The upper platten is then lowered so that the lower mold half 5 engages the rough elastomer lying in the lower mold half 3 and compression force is applied in the usual manner along with heat. The mold halves in assembled position are shown in Figure 1. As will be understood, the elastomer flows under the heat and pressure until it fully occupies the molding cavity and assumes the configuration of the cavity. Overflow elastomer material can be vented into appropriate vent reservoirs in accordance with the normal practice. After appropriate time for release of pressure and cooling, the upper platten is vertically raised along with upper mold half 5. The non-molding surfaces of the upper fingers slide on the non-molding surfaces of the lower fingers leaving vertical parting lines 23 on the forward and rear faces of the threads of the molded article. Horizontal parting lines 24 are left on the tread surfaces of the article. The article is then removed from the lower mold and the process is repeated. Each article is a helically threaded molded elastomer roller having treads of constant width.

It should be noted from the above that during the operation so described, the undercut areas in the side faces of the threads in the upper half of the helical roller 1 were formed in cavities created by fingers 13 and 14 of the lower molding half 3. Couversely, the undercut areas in the lower half of the helical roller 1 were formed in cavities created by fingers 17 and 18 of the upper molding half 5.

To facilitate further understanding of the invention, the mold construction and the spiral roller itself are described as follows. The helical threaded roller has a helical thread extending through an arc of 360°. The lower mold part 3 has spaced apart molding surfaces helixing about a common axis on fingers 13 and 14 arranged in pairs on opposing sides of the mold half. The upper molding half 5 has similar pairs of spaced apart molding surfaces on fingers 17 and 18 helixing about a common axis. These pairs of upper fingers and lower fingers simultaneously form the forward and rear faces of the 360° thread as described in detail above. But, the molding surfaces for one face of the thread lead the molding surfaces for the other face of the thread by 90°. Between the spaced apart molding surfaces of the fingers are provided complementary seating surfaces 15, 16, 19 and 20 which preferably are disposed normal to the axis of the thread and extend over the arc of displacement.

Preferably, the configuration of the mold halves 3 and 4 are designed so that the pitch of the helical thread of the roller decreases towards its ends. See, for example, Figure 2 where the last three threads of the cavity have approximately one-half the pitch of the threads in the center of the cavity. This is accomplished simply by moving the fingers 13, 14, 17 and 18 closer together along their common axis in this area as will be understood.

In use of the spiral threaded molded elastomer roller of the invention in belt conveyor systems, the roller 1 is installed in the usual manner by placing its steel ends 11 in the support bearings. The belt will be carried and supported by the roller as will be understood. I have found that the roller 1 of the invention carries heavy weights at high speed without jostling, vibration, whipping or other undesirable action.

Since the invention is not limited to the specific embodiments illustrated in the drawings and specifically described above, it should be understood that no limitation thereto is intended except as expressed in the claims which follow hereinafter.

I claim:

1. A mold for forming a helical threaded article having a plurality of threads characterized by the fact that the mold consists of two molding halves, each half having molding surfaces of helical configuration, one side of the bottom molding half having fingers with molding surfaces of helical configuration extending upwardly through an angle of 135° to mold one side of the forward face of each thread, the corresponding side of the top molding half having fingers with molding surfaces of helical configuration extending downwardly through an angle of 135° to mold the same side of the rear face of each thread, the other side of the bottom molding half having fingers with molding surfaces of helical configuration extending upwardly through an angle of 135° to mold one side of the rear face of each thread, the other side of the top molding half having fingers with molding surfaces of helical configuration extending downwardly through an angle of 135° to mold the remaining side of the forward face of each thread, and all of the fingers having complementary non-molding surfaces, the non-molding surfaces of the fingers on the bottom molding half for the forward faces of the threads seating with the non-molding surfaces of the fingers on the top molding half for the rear faces of the threads and the non-molding surfaces of the fingers on the top molding half for the forward faces of the threads slidingly seating with the non-molding surfaces of the fingers on the bottom molding half for the rear faces of the threads when the mold halves are assembled.

2. The subject matter of claim 1 characterized by the fact that the non-molding surfaces of the fingers are flat.

3. The subject matter of claim 2 characterized by the fact that the non-molding surfaces of the fingers are normal to the axis of the thread for sliding engagement when the mold halves are assembled.

References Cited in the file of this patent

UNITED STATES PATENTS

| | | |
|---|---|---|
| 2,133,019 | Campbell | Oct. 11, 1938 |
| 2,225,632 | Herman | Dec. 24, 1940 |
| 2,321,469 | Draving | June 8, 1943 |
| 2,421,058 | Eckstein | May 27, 1947 |
| 2,497,914 | Sawyer | Feb. 21, 1950 |
| 2,703,165 | Couser | Mar. 1, 1955 |
| 2,730,222 | Klein | Jan. 10, 1956 |